United States Patent
Nelson et al.

(10) Patent No.: US 9,593,672 B2
(45) Date of Patent: Mar. 14, 2017

(54) ISOCHRONOUS WIND TURBINE GENERATOR CAPABLE OF STAND-ALONE OPERATION

(71) Applicant: Siemens Aktiengesellschaft, Munich (DE)

(72) Inventors: Robert J. Nelson, Orlando, FL (US); Jesper Hammelsvang, Orlando, FL (US); Hongtao Ma, Orlando, FL (US); Jakob Skjoeth, Porter, TX (US)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/960,875

(22) Filed: Aug. 7, 2013

(65) Prior Publication Data

US 2015/0042092 A1    Feb. 12, 2015

(51) Int. Cl.
*H02M 1/12* (2006.01)
*F03D 9/00* (2016.01)
*F03D 7/04* (2006.01)
*H02M 7/44* (2006.01)
*H02M 5/45* (2006.01)
*H02M 5/42* (2006.01)
*H02J 3/38* (2006.01)
*H02J 3/40* (2006.01)

(52) U.S. Cl.
CPC ............ *F03D 9/005* (2013.01); *F03D 7/048* (2013.01); *H02J 3/386* (2013.01); *H02J 3/40* (2013.01); *H02M 1/12* (2013.01); *H02M 5/42* (2013.01); *H02M 5/45* (2013.01); *H02M 7/44* (2013.01); *Y02E 10/723* (2013.01)

(58) Field of Classification Search
USPC ............ 363/34, 35, 36, 37, 39, 149; 307/87; 323/205, 207
See application file for complete search history.

(56) References Cited

U.S. PATENT DOCUMENTS

| | | | |
|---|---|---|---|
| 5,448,204 A | * | 9/1995 | Gardner .................... 331/25 |
| 7,394,166 B2 | | 7/2008 | Teichmann |
| 7,492,617 B2 | | 2/2009 | Petter |
| 7,577,006 B2 | | 8/2009 | Neacsu |
| 7,635,967 B2 | | 12/2009 | Loucks |
| 8,188,610 B2 | | 5/2012 | Scholte-Wassink |
| 8,310,214 B2 | | 11/2012 | Rivera |

(Continued)

FOREIGN PATENT DOCUMENTS

| | | |
|---|---|---|
| EP | 2328251 A2 | 6/2011 |
| GB | 2432267 A | 5/2007 |
| WO | 03030329 A1 | 4/2003 |

*Primary Examiner* — Timothy J Dole
*Assistant Examiner* — Ishrat Jamali

(57) ABSTRACT

A power generating device (2, 3) for supplying power to a power system (37). The power generating device includes a first component (87) for generating a first signal representing a frequency of a voltage on the power system, a power converter (90) for generating an output voltage, a second component (82) responsive to the first signal and to a second signal representing the output voltage, the second component producing an error signal representing a phase angle difference between the first and second signals, and the error signal being an input to the power converter for controlling the power converter to maintain the phase angle difference between the output voltage and the first signal.

14 Claims, 1 Drawing Sheet

(56) References Cited

U.S. PATENT DOCUMENTS

2006/0002157 A1* 1/2006 Petter et al. .................. 363/37
2008/0284172 A1    11/2008 Nielsen
2012/0147637 A1*  6/2012 Petter ............................. 363/74
2012/0261917 A1   10/2012 Egedal
2013/0190938 A1    7/2013 Zadeh et al.

* cited by examiner

ISOCHRONOUS WIND TURBINE GENERATOR CAPABLE OF STAND-ALONE OPERATION

FIELD OF THE INVENTION

The invention relates to wind turbines providing power to a load, and more particularly to wind turbines operating without synchronizing to a synchronous generator or a system voltage, but instead, synchronizing to an internally generated frequency signal.

BACKGROUND OF THE INVENTION

As is known in the art, wind energy can be converted to electrical energy with a wind turbine generator (WTG).

Virtually all wind turbines are based on one of the three main wind turbine types:
 fixed speed WTGs with a direct grid-coupled (asynchronous) squirrel cage induction generator;
 variable speed WTGs with a doubly fed induction generator; and
 variable speed WTGs with a direct-drive synchronous generator.

A fixed-speed WTG is typically connected to the grid through an induction (asynchronous) generator for generating real power. Wind-driven blades drive a blade rotor that in turn operates through a gear box (i.e., a transmission) to turn a gearbox output shaft at a fixed speed. The gearbox output shaft is connected to an induction generator for generating real power.

In the induction generator the rotor and its associated conductors rotate faster than the rotating flux applied to the stator from the grid (i.e., higher than the synchronous field frequency). The difference in these two values is referred to as "slip." At this higher speed, the direction of the induced rotor current is reversed, in turn reversing the counter EMF generated in the rotor windings, and by generator action (induction) causing current (and real power) to be generated in and flow from the stator windings.

The frequency of the voltage generated in the stator is the same as the frequency of the voltage applied to the stator to develop the stator excitation. The induction generator may use a capacitor bank for reducing reactive power consumption (i.e., the power required to generate the initial stator flux) from the power system.

The fixed-speed wind turbine is simple, reliable, low-cost and proven. But its disadvantages include uncontrollable reactive power consumption (as required to generate the stator rotating flux), mechanical stresses, limited control of power quality and relatively inefficient operation. In fact, wind speed fluctuations result in mechanical torque fluctuations that can result in fluctuations in the electrical power on the grid.

Variable speed WTG operation can be achieved only by decoupling the electrical grid frequency and the mechanical rotor frequency. The rotational blade speed of a variable speed WTG can be controlled to continuously adapt to the wind speed and maximize the power generated by the wind turbine. Since an electric generator is usually coupled to a variable speed WTG rotor through a fixed-ratio gear transmission, the electrical power produced by the generator has a variable frequency.

Decoupling the grid frequency from the rotor mechanical frequency requires use of an electronic power converter. Generally, the power converter imparts characteristics to the generated electricity that are required to match electricity flowing on the grid, including controllable active power flow, voltage magnitude and frequency regulation. Thus the converter converts the variable electrical frequency and voltage output from the generator stator to the grid frequency and voltage.

The power converter uses either a direct frequency converter or a full converter. The full converter first converts the variable frequency stator output to DC in a generator-side converter (rectifier). A grid-side or network-side converter (inverter) reconverts the DC to a fixed-frequency AC (equal to the grid frequency) for supplying to the electrical grid. In both cases, the power converter effectively electrically decouples the WTG from the electrical grid.

The AC output voltage of the network-side converter is filtered and supplied to the grid via a step-up transformer. Protective switchgear can be included to provide a reliable connection to the grid and to isolate the WTG and converter from the grid as required.

Although variable speed WTGs are advantageous from the perspective of increased energy conversion and reduced mechanical stresses, the electrical generation system is more complicated than that of a constant speed wind turbine due primarily to the need for a power converter.

In a variable speed turbine having a doubly fed induction generator (DFIG) the grid is fed directly from the stator windings. A power converter feeds the rotor winding, but a converter is not interposed between the grid and the stator windings. The electrical rotor frequency is varied by the converter, thus decoupling the mechanical and electrical frequency and making variable speed operation possible.

The exciting field produced by the generator's rotor rotates relative to the generator's rotor with a variable speed according to the wind turbine blade speed. The variable rotor speed is compensated by action of the converter that correspondingly adjusts the speed of the exciting field relative to the rotor's rotation speed. As a result, the sum of the two speeds, i.e. the speed of the exciting field relative to the rotor field is always a constant value equal to the fixed grid frequency. Note that the converter used in the DFIG wind turbine is used only to produce the variable frequency exciting-field rotor currents.

Both fixed speed and variable speed WTGs are designed to operate in parallel with a synchronous generator, both supplying power to the grid. The WTG's synchronize to the grid frequency to produce a constant frequency electrical output.

The fixed speed WTG requires synchronization to maintain a constant slip value and thereby supply power at the grid frequency.

A synchronizing frequency is also necessary for variable speed WTGs since they require a system frequency for use in switching/commutating the switching devices in the network-side converter to supply fixed frequency power to the grid.

If this synchronization with the grid is not provided, the WTGs operate in a so-called island mode, which results in degradation in the quality of the electricity supplied to the local load during the islanding period due to the lack of utility control of the WTG. During this time, uncontrolled voltage or frequency excursions can damage customer equipment connected to the WTG.

Also, if the island mode was caused by disconnection from the grid due to a transient system fault, when the system interrupting devices try to re-close the grid connection after a few cycles, the re-closing action can potentially damage the WTG. For example, damage may occur if the voltage in the island mode is not the same as the grid voltage. Also, when the grid is reconnected, the grid voltage can have a different phase angle with respect to the island voltage. This can cause a relatively large over-current excursion that can damage the WTG.

FIG. 1 illustrates a prior art wind turbine generator park 1 comprising variable speed wind turbine generators 2, 3.

The WTGs 2, 3 generate electrical power that is supplied to a power system or utility grid 37 via a node 35. Preferably, the WTGs 2, 3 are variable speed wind turbines, i.e., the rotational speed of their respective generator rotors is variable depending on wind conditions.

Each WTG 2, 3 comprises turbine blades 4, 5 attached to a rotor shaft 6, 7 for transmitting the torque of the wind-driven blades 4, 5 to a gearbox 8, 9. An output shaft of the gearbox 8, 9 drives an AC generator 17, 19 for transforming the mechanical power provided by rotation of the rotor shaft 6, 7 to electrical power. The gearbox 8, 9 provides a transmission ratio that allows the gearbox output shaft to turn at a different speed than the rotor shaft 6, 7. Preferably the gearbox output shaft turns at a speed that optimizes the electricity generated by the AC generators 17 and 19.

The AC generator 17, 19 can be either a synchronous generator or an asynchronous (induction) generator and further comprises power electronics components. Generally, in a synchronous generator, a generator rotor rotates at the same rotational frequency as the rotating magnetic field produced by a generator stator (or with an integer relationship to the frequency of the rotating magnetic field, where that integer relationship depends on the number of rotor pole pairs).

In contrast thereto, in an asynchronous generator (induction generator) the rotational frequency of the stator's magnetic field (conventionally 60 Hz when the stator magnetizing current is supplied from the electrical grid) is independent from the rotational frequency of the rotor. The difference in rotational frequency of the rotor and the stator is numerically described by a slip value.

If the generators 17, 19 of FIG. 1 comprise synchronous generators, the frequency of the output power therefrom depends on wind velocity. But that output frequency must be converted to the frequency of the electrical grid to which the generators 17, 19 supply electricity through the node 35.

The frequency conversion process is accomplished by action of power electronics frequency converters 21, 23. Each frequency converter converts the frequency of the electrical power delivered by generators 17, 19 into electrical power having a fixed frequency corresponding to the frequency of the power system 37. Each frequency converter 21, 23 comprises a respective generator-side converter (rectifier) 25, 27 for converting the AC current produced by the generator 17, 19 into a DC current. A network-side converter (an inverter) 29, 31 converts the DC current back to an AC current at the frequency of the power system 37. The AC output of the network-side converter 29, 31 is supplied to the power system 37 via the node 35 and a transformer 33.

As is known, the magnitude of power flow on a power system depends primarily on the voltage phase angle difference between two points, since a line reactance between the two points is constant and the voltage at each of the two points is nearly constant. Then the power flow is governed by the equation:

$$P=(V1 \times V2/X12)\sin \delta$$

where V1 and V2 are the voltages at locations 1 and 2, X12 is the reactance between locations 1 and 2, and δ is the phase angle difference between the voltages at locations 1 and 2.

The same formula can be applied to determine the power that electric generators deliver to a section of a power system. In this application, V1 and V2 are the voltage magnitudes at the respective terminals of the generators 1 and 2, X12 is the line reactance between the two generators, and δ is the phase angle difference between the two generator voltages. Note that if a difference between the voltage phase angles of generators 1 and 2 is zero, no power is supplied to a load.

A wind turbine generator is frequency-synchronized with the system voltage as that voltage is determined or measured at the WTG terminals. The voltage at the WTG terminals has a phase angle and magnitude determined by the aggregate of generators and loads on the system.

According to the prior art, a phase-locked loop (PLL) of a WTG controller detects the phase angle of the network voltage present at its terminals. The network voltage is supplied by one or more synchronous generators on the grid. The WTG controller further establishes a WTG voltage at a given phase angle difference so that the WTG and the synchronous generators can provide real power to the grid according to the equation, $$P=(Vt \times Vsys/X)\sin \delta$$

where P is the total power delivered to the grid by the WTG, Vt is the wind turbine generator converter output voltage (or the voltage at the WTG output terminals), Vsys is the grid or system voltage, X is the reactance of the line and transformer(s), if applicable, between the WTG and the power system or the grid, and δ is the phase angle by which the WTG voltage (as provided from the converter and supplied to the WTG output terminals and from there to the grid) leads the power system voltage.

Note that according to the equation immediately above, the WTG output and the system voltage are not "in phase synchronism" as the phase angles differ by the angle δ. In fact, if the phase angle between the WTG voltage and the voltage of the system to which the WTG is connected is zero, no power is transferred to system loads, i.e., sin δ=0 if δ=0.

However, as is known by those skilled in the art, synchronism generally refers to frequency synchronism. If the frequency of the WTG and the system is the same and the phase angle remains constant or varies only slowly, the WTG and the system are considered to be operating in synchronism. Then if the phase difference is constant the output power supplied to the grid is constant. If the phase difference varies slowly, the power supplied to the grid varies slowly at that same slow rate.

BRIEF DESCRIPTION OF THE DRAWINGS

The invention is explained in the following description in view of the drawings that show.

DETAILED DESCRIPTION OF THE INVENTION

Figure 1:
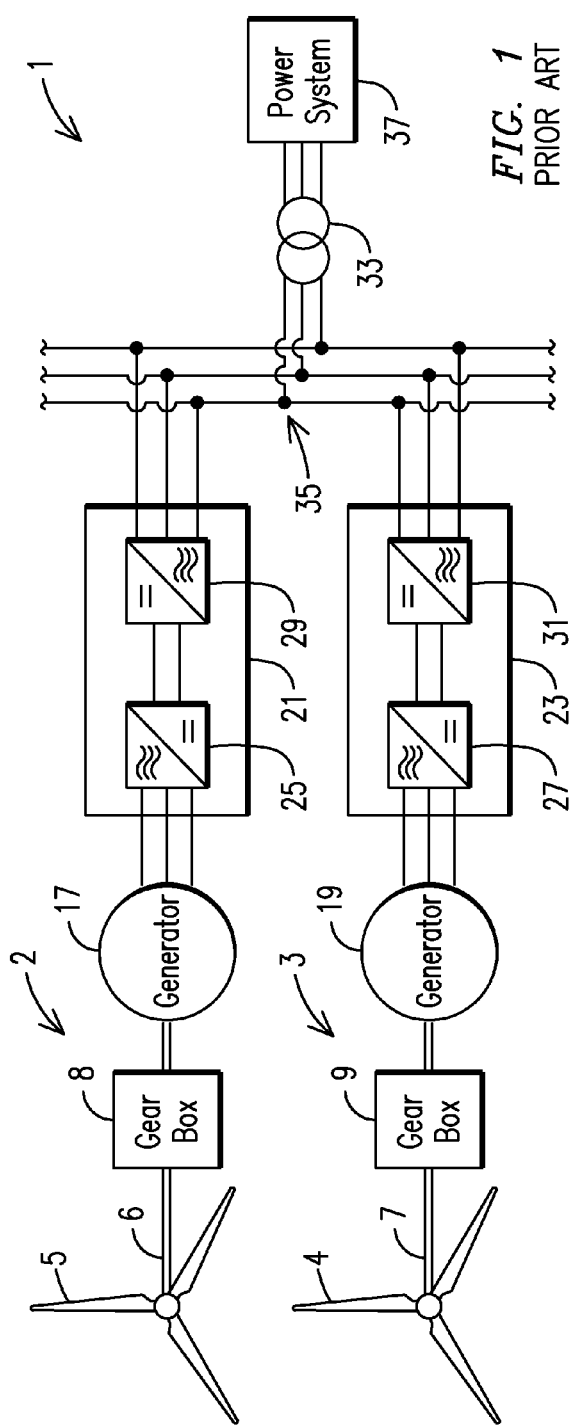
FIG. 1 is a prior art wind turbine generator park.

It is known in the prior art that a wind turbine generator (whether employing an induction generator or a synchronous generator) cannot "pick up" a load and supply electric power to it. Instead, the WTG must be associated with (e.g., coupled to) a power grid or power system to which one or more synchronous generators supply power. The prior art WTG converter measures the frequency of the grid voltage present at its output terminals then adjusts the phase angle of its output voltage to establish a desired phase angle difference δ, which in turn determines the power delivered to the grid according to the equations above.

Thus the prior art WTGs require the grid voltage as an input from which the grid voltage frequency can be determined. Given this requirement, prior art WTG's are not capable of stand-alone operation.

The present invention teaches a self-commutating WTG that has an inherent capability to operate in a stand-alone mode and thus operate isochronously. The invention also allows the WTG to supply power to a local load without the need for a synchronous generator or grid to which the wind turbine generator can synchronize. Thus a WTG of the present invention can operate independently of the grid.

A single WTG (or a wind turbine park comprising several WTGs with at least one WTG employing the features of the present invention) can provide black start power following grid outages and satisfy local loads without requiring a grid connection. This black start capability is a vital ancillary service that WTGs can provide for blackout recovery.

The present invention is considered especially beneficial during startup. In some circumstances a grid connection is not available during a WTG startup phase. For example, the wind turbine park may be in a very isolated region or out in the ocean at a great distance from the nearest grid connection. In other situations a connection to the primary grid may not yet be available when the WTG is ready for operation or the grid may be inoperative. In any of these situations the WTG is ready for operation to serve local loads, for example, but without the presence of a grid system and it is grid frequency signal, the WTG or the wind turbine park cannot be operated.

The inventors are personally aware of one situation where it was required that the WTGs be built almost a year before a transmission line connection to the grid was available. During this interval it would have been preferred to use the WTG generated electricity to operate ancillary equipment (dehumidifiers, fans, etc.) without the necessity of transporting a diesel generator to the site for supplying a synchronizing signal for the WTG.

The inventors have recognized that the wind turbine generator must establish a frequency reference signal that mimics the frequency reference signal that would have been supplied by a synchronous generator voltage or by a grid voltage in order to operate isochronously.

According to the present invention, a turbine converter controller or a turbine controller generates a constant frequency signal (i.e., 60 Hz or 50 Hz as appropriate). See FIG. 2. This constant frequency internally-generated signal represents the grid voltage or an output voltage of a synchronous generator. Most turbine converter controllers or turbine controllers manufactured today include the necessary components to generate this accurate 60 Hz signal.

Figure 2:
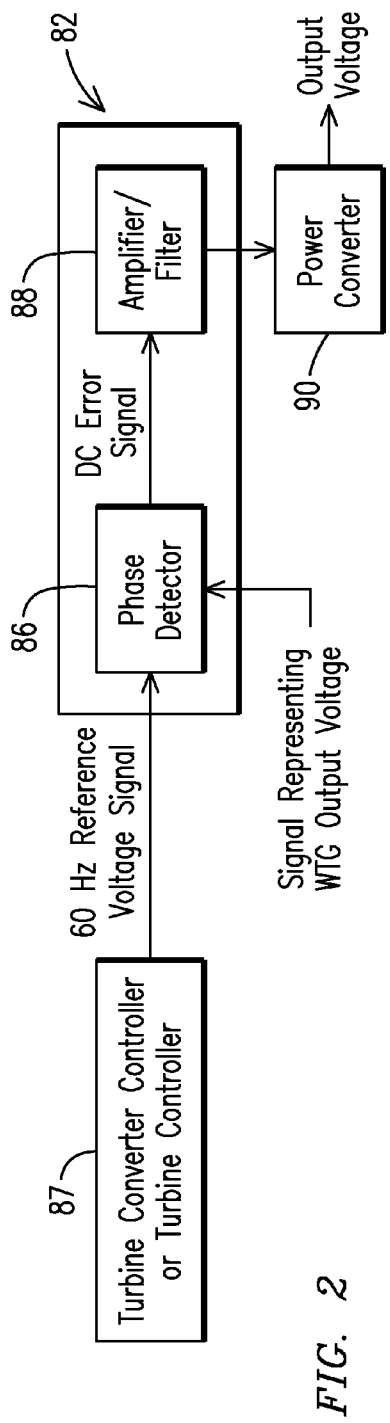
FIG. 2 is a phase locked loop for use with the present invention.

As illustrated in FIG. 2, the 60 Hz constant frequency or reference voltage signal is generated by a turbine converter or turbine converter controller 87 and input to a phase detector 86, a component of phase locked loop (PLL) 82. This reference voltage signal represents the grid voltage or an output voltage of a synchronous generator. A signal representing the WTG output voltage is also input to the phase detector 86.

The phase detector 86 determines the phase angle and frequency difference between the constant frequency 60 Hz voltage signal and the WTG output voltage, and generates a DC error signal responsive to that difference. The DC error signal is amplified (DC amplifier) and filtered to remove noise components in an amplifier/filter 88.

The output signal from the amplifier/filter 88 is input to a WTG power converter 90 to control the frequency and phase of the voltage supplied to the power system by the WTG.

The resulting error voltage is input to the WTG power converter 90 for controlling the frequency/phase of the WTG output voltage. The PLL 82 operates as a feedback component constantly determining the phase difference between its input signals and generating an error signal until that phase difference reaches the desired value δ as in the equation above.

The present invention can also be used with a wind turbine park, such as the wind turbine park 1 illustrated in FIG. 1. With reference to FIG. 1, if the WTG 2 provides the DC error signal and synchronizes to the 60 Hz reference signal referenced in FIG. 2, the WTG 2 is referred to as a base turbine generator.

Preferably, only one of the wind turbine generators in a wind turbine park generates voltage using the internally-generated 60 Hz reference voltage. That WTG then establishes the phase angle of its output voltage. A second WTG in the park synchronizes with the voltage of the first WTG. A third WTG in the park then sees a voltage that represents a composite voltage of the first and second WTGs. The third WTG synchronize to that composite voltage. The synchronizing process is repeated for each additional WTG in the park. Thus only one WTG should be synchronized with the reference 60 Hz signal and the other WTGs in the park have a voltage to which they can lock.

Since the constant frequency reference voltage is internally generated within the WTG, WTGs can be commissioned and/or tested without the need for synchronizing to the grid or synchronizing to a mobile generator (e.g., a diesel generator transported to the site of the WTGs). Clearly a connection to the grid is also not required as the WTG's use the internally-generated reference voltage.

As known by those skilled in the art, there are several circuits and devices that can generate the 60 Hz signal. For example, an oscillator feeding a tuned circuit with a resonant frequency of 60 Hz can be used for this purpose.

Although the present invention has been described using a phase locked loop to synchronize the wind turbine generator output voltage and a reference voltage at the desired frequency/phase, a phase locked loop is not required to synchronize these signals. Those skilled in the art are familiar with other techniques and devices for providing the desired synchronization between two signals.

Although the present invention has been described in the context of wind turbine generators, its teachings are also applicable to solar or photovoltaic generators or any other electricity generating devices employing a network or grid side converter that must supply electricity/power at a fixed frequency and a desired phase angle. The teachings of the present invention are also applicable to mobile power generating equipment.

Although the description above has focused on the generation of voltage for an electrical grid for supplying real power to the grid, the inventive concepts can also be used to generate reactive power for the grid.

In another embodiment a frequency of the WTG output signal may differ from the constant frequency (e.g., reference) signal. This difference is a function of the load on the electrical grid. This frequency difference is referred to as frequency droop.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine generator for supplying an output voltage to a power system, the wind turbine generator comprising:
a turbine controller or a turbine converter controller not connected to the power system for generating a first signal representing a frequency of a voltage on the power system;
a power converter for generating the output voltage supplied by the wind turbine generator;
a component responsive to the first signal and to a second signal representing the output voltage supplied by the wind turbine generator, wherein the first signal is not combined with another frequency or phase representing signal before input to the component;
the component for producing an error signal representing a phase angle difference between the first and second signals; and
the error signal input to the power converter for controlling the power converter to control the output voltage by synchronizing the frequency of the second signal to the frequency of the first signal and by maintaining a desired phase angle difference between the first and second signals.

2. The wind turbine generator claim 1 wherein the output voltage from the wind turbine generator and the voltage on the power system have the same frequency.

3. The wind turbine generator of claim 1 wherein the frequency of the voltage on the power system is 50 Hz, 60 Hz, or another predetermined frequency.

4. The wind turbine generator of claim 1 wherein real power is determined by $$P=(Vt \times Vsys/X)\sin \delta$$

where P is the total real power supplied to the power system by the wind turbine generator, Vt is an output voltage from the wind turbine generator, Vsys is a voltage of the power system to which the wind turbine generator supplies power, X is a reactance of a conductor connecting the wind turbine generator and the power system and δ is the desired phase angle relationship.

5. The wind turbine generator of claim 1 wherein the component comprises a phase locked loop further comprising a serial configuration of a phase detector and an amplifier/filter, wherein the phase detector is responsive to the first and second signals to produce a phase detector signal and the amplifier/filter is responsive to the phase detector signal for producing the error signal.

6. The wind turbine generator of claim 1 wherein the power supplied to the power system comprises real power, reactive power or a combination of real and reactive power.

7. A power generating device for supplying an output voltage to a power system, the power generating device comprising a wind turbine park comprising a plurality of wind turbine generators, one of the plurality of wind turbine generators comprising:
a turbine controller or a turbine converter controller not connected to the power system for generating a first signal representing a frequency of a voltage on the power system;
a power converter for generating the output voltage supplied by the one of the plurality of wind turbine generators;
a component responsive to the first signal and to a second signal representing the output voltage from the one of the plurality of wind turbine generators, wherein the first signal is not combined with another frequency or phrase representing signal before input to the component;
the component for producing an error signal representing a phase angle difference between the first and second signals; and
the error signal input to the power converter for controlling the power converter to control the output voltage by synchronizing the frequency of the second signal to the frequency of the first signal and by maintaining a desired phase angle difference between the first and second signals.

8. The power generating device of claim 7 wherein the output voltage from the one of the plurality of wind turbine generators and the voltage on the power system have the same frequency.

9. The power generating device of claim 7 wherein the frequency of the voltage on the power system is 50 Hz, 60 Hz, or another predetermined frequency.

10. The power generating device of claim 7 wherein the power is determined by $$P=(Vt \times Vsys/X)\sin \delta$$

where P is the total real power supplied to the power system by the wind turbine park, Vt is an output voltage from the wind turbine park, Vsys is a voltage of the power system to which the wind turbine park supplies power, X is a reactance of a connection between the wind turbine park and the power system and δ is the desired phase angle difference.

11. The power generating device of claim 7 wherein the component comprises a phase locked loop further comprising a serial connection of a phase detector and an amplifier/filter, wherein the phase detector is responsive to the first and second signals to produce a phase detector signal and the amplifier/filter is responsive to the phase detector signal for producing the error signal.

12. The power generating device of claim 7 wherein others of the plurality of wind turbine generators generate an output voltage synchronized to the output voltage of the one of the plurality of wind turbine generators.

13. The power generating device of claim 7 wherein the power supplied to the power system comprises real power, reactive power or a combination of real and reactive power.

14. A wind turbine generator comprising:
a power generator operable to generate an output voltage;
a turbine controller or a turbine converter controller operable to produce a reference signal independent of and not connected to a power grid or another wind turbine generator; and
a power converter responsive to the output voltage and the reference signal to control the output voltage by synchronizing the frequency of the output voltage and the reference signal and by maintaining a desired phase angle difference between the output voltage and the reference signal, thereby allowing the wind turbine generator to operate isochronously; wherein the frequency reference signal is not combined with another frequency or phase representing signal before input to the power converter.

* * * * *